(12) United States Patent
Cha et al.

(10) Patent No.: US 8,160,424 B2
(45) Date of Patent: Apr. 17, 2012

(54) BROADCAST RECEIVER AND METHOD FOR DIAGNOSTIC INFORMATION PRESENTATION

(75) Inventors: Sang Hoon Cha, Seoul (KR); Kwang Hun Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 1239 days.

(21) Appl. No.: 11/480,535

(22) Filed: Jul. 5, 2006

(65) Prior Publication Data

US 2007/0098352 A1 May 3, 2007

(30) Foreign Application Priority Data

Nov. 2, 2005 (KR) .................. 10-2005-0104279

(51) Int. Cl.
*H04N 9/88* (2006.01)
(52) U.S. Cl. .............. 386/263; 386/E5.002; 348/E7.054
(58) Field of Classification Search .............. 386/46, 386/263, E5.002; 725/100, 110; 348/E7.054
See application file for complete search history.

(56) References Cited

U.S. PATENT DOCUMENTS

| 7,813,249 | B2 * | 10/2010 | Kato ............................... 369/94 |
| 2002/0054750 | A1 * | 5/2002 | Ficco et al. .................... 386/46 |
| 2003/0053798 | A1 * | 3/2003 | Roshanski et al. ........... 386/111 |
| 2003/0206719 | A1 | 11/2003 | Bumgardner et al. |
| 2005/0015813 | A1 | 1/2005 | Yun |
| 2006/0059391 | A1 * | 3/2006 | Park ............................... 714/48 |
| 2007/0050836 | A1 * | 3/2007 | Stanek et al. ................ 725/131 |

FOREIGN PATENT DOCUMENTS

| EP | 0 508 394 A2 | 10/1992 |
| JP | 2003-153151 | 5/2003 |
| KR | 10-2005-0023697 | 3/2005 |
| KR | 10-2005-0081234 | 8/2005 |
| KR | 10-2006-0132324 | 12/2006 |
| WO | WO 01/82598 A2 | 11/2001 |
| WO | WO 2004/100539 A1 | 11/2004 |

OTHER PUBLICATIONS

Society of Cable Telecommunications Engineers ANSI/SCTE 28 2003 HOST-POD interface Standard.*
Society of Cable Telecommunications Engineers: "Host-Pod Interface Standard-Host-Pod Interface Specification", URL:http://www.scte.org/documents/pdf/ANSI [retrieved on Nov. 17, 2006], XP002408006, pp. 1-225.

* cited by examiner

*Primary Examiner* — Thai Tran
*Assistant Examiner* — Girumsew Wendmagegn
(74) *Attorney, Agent, or Firm* — McKenna Long & Aldridge LLP

(57) ABSTRACT

A host includes a controller configured to collect video data recording device diagnostic information from a video data recording device. The controller is further configured to control displaying of the video data recording device diagnostic information.

11 Claims, 3 Drawing Sheets

FIG. 1

| Syntax | No. of Bits | Mnemonic |
|---|---|---|
| DVR_status_report() { <br>   Host_type <br>   if (Host_type=0x01 \|\| Host_type== <br>0x02 <br>     \|\| Host_type==0x03) { <br>     DVR_storage_type <br>     DVR_storage_status <br>     DVR_operation_status <br>     reserved <br>     Encryption_status <br>       Storage_usage_status <br>   } <br>} | 8 <br><br><br><br>8 <br>8 <br>8 <br>7 <br>1 <br>8 | uimsbf <br><br><br><br>uimsbf <br>uimsbf <br>uimsbf <br>'1111111' <br>bslbf <br>uimsbf |

BROADCAST RECEIVER AND METHOD FOR DIAGNOSTIC INFORMATION PRESENTATION

This application claims the benefit of Korean Application No. 10-2005-0104279, filed on Nov. 2, 2005, which is hereby incorporated by reference as if fully set forth herein.

BACKGROUND

1. Field of the Disclosure

The present disclosure relates to a broadcast receiver and method for diagnostic information presentation.

2. Background

An apparatus for receiving broadcasts, such as a broadcast receiver may be referred to as a host and the host may include a communication interface for communicating with a broadcasting station. Where the host does not have a communication interface, the host may instead use a communication device that may be mounted in the host through a slot or the like.

The host may be connected to peripheral devices (for example, a digital television, a DVD player, a digital camera, and a set-top box) through various types of interfaces or one or more of the various peripheral devices may be built into the host. For example, a cable broadcast receiver, which is a broadcast receiver for receiving cable broadcasts, may create and transmit diagnostic information to a cable broadcasting station.

The following description will be given with reference to a cable broadcast receiver as an example of the broadcast receiver.

A cable broadcast system may include a cable broadcast station that transmits cable broadcasts and a cable broadcast receiver that receives cable broadcasts. The cable broadcast system is generally referred to as a System Operator (SO) headend or a Multiple System Operator (MSO) headend. The SO is a local cable/TV broadcast provider and the MSO is a group of system operators.

The cable broadcast receiver may be a digital built-in TV, a digital ready TV, etc. The cable broadcast receiver may adopt an open cable mode and may use a cable card or a Point Of Deployment (POD) module that may include a Conditional Access (CA) system. Alternatively, the cable broadcast receiver may have a built-in module that is a functional equivalent of the cable card. In this instance, the cable broadcast receiver may receive a CA system, in a form of a software, that is downloaded from the SO or MSO and stored in a memory of the cable broadcast receiver. The downloadable software is usually referred to as downloadable conditional access system (DCAS). As such, the cable broadcast receiver may have a configuration that may or may not require a separate cable card.

Where a cable card is required, the cable card may use a Personal Computer Memory Card International Association (PCMCIA) standard in order to interface with the cable broadcast receiver. The cable card may be inserted in a slot provided at the cable broadcast receiver. Where the cable broadcast receiver and the cable card use open cable standard, communication between the cable broadcast receiver and the cable card may be performed using Generic Diagnostic Protocol.

Recently, a Digital Video Recorder (DVR) has attracted considerable attention because it can store and present broadcasts. The DVR may be a standalone device or may be included in hosts, such as a set-top box, a cable broadcast receiver such as a digital television set, a personal video recorder (PVR), and so on. However, there exists a problem in that, when the broadcast receiver has a DVR function, diagnostic information of the DVR function cannot be presented to a user.

SUMMARY

Accordingly, the present disclosure is directed to cable broadcast receivers and methods for diagnostic information presentation that substantially obviate one or more problems described above.

For example, the disclosure may disclose a cable broadcast receiver including a Digital Video Recorder (DVR) function, where the status of the DVR function may be diagnosed and its diagnostic result may be presented to a user.

Advantages, objects, and features of the invention in part may become apparent in the description which follows and in part may become apparent to those having ordinary skill in the art upon examination of the following or may be learned from practice of the invention. The objectives and other advantages of the various embodiments may be realized and attained by the structures and processes described in the written description, in the claims, and in the appended drawings.

To achieve these objects and other advantages and in accordance with the purpose of the invention, as embodied and broadly described herein, a host includes a controller configured to collect video data recording device diagnostic information from a video data recording device, and the controller is further configured to control displaying of the video data recording device diagnostic information.

In another aspect, a host includes a controller configured to collect video data recording device diagnostic information from a video data recording device, and further configured to forward the video data recording device diagnostic information to a communication device. The controller is further configured to control displaying of the video data recording device diagnostic information.

In yet another aspect, a method includes receiving a request for video data recording device diagnostic information; collecting the video data recording device diagnostic information in accordance with the request; and displaying the collected video data recording device diagnostic information.

It is to be understood that both the foregoing general description and the following detailed description are exemplary and explanatory and should not be construed as limiting the scope of the claims.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates a syntax for diagnostic information of a DVR function according to one embodiment of the present invention;

DETAILED DESCRIPTION

Figure 2:
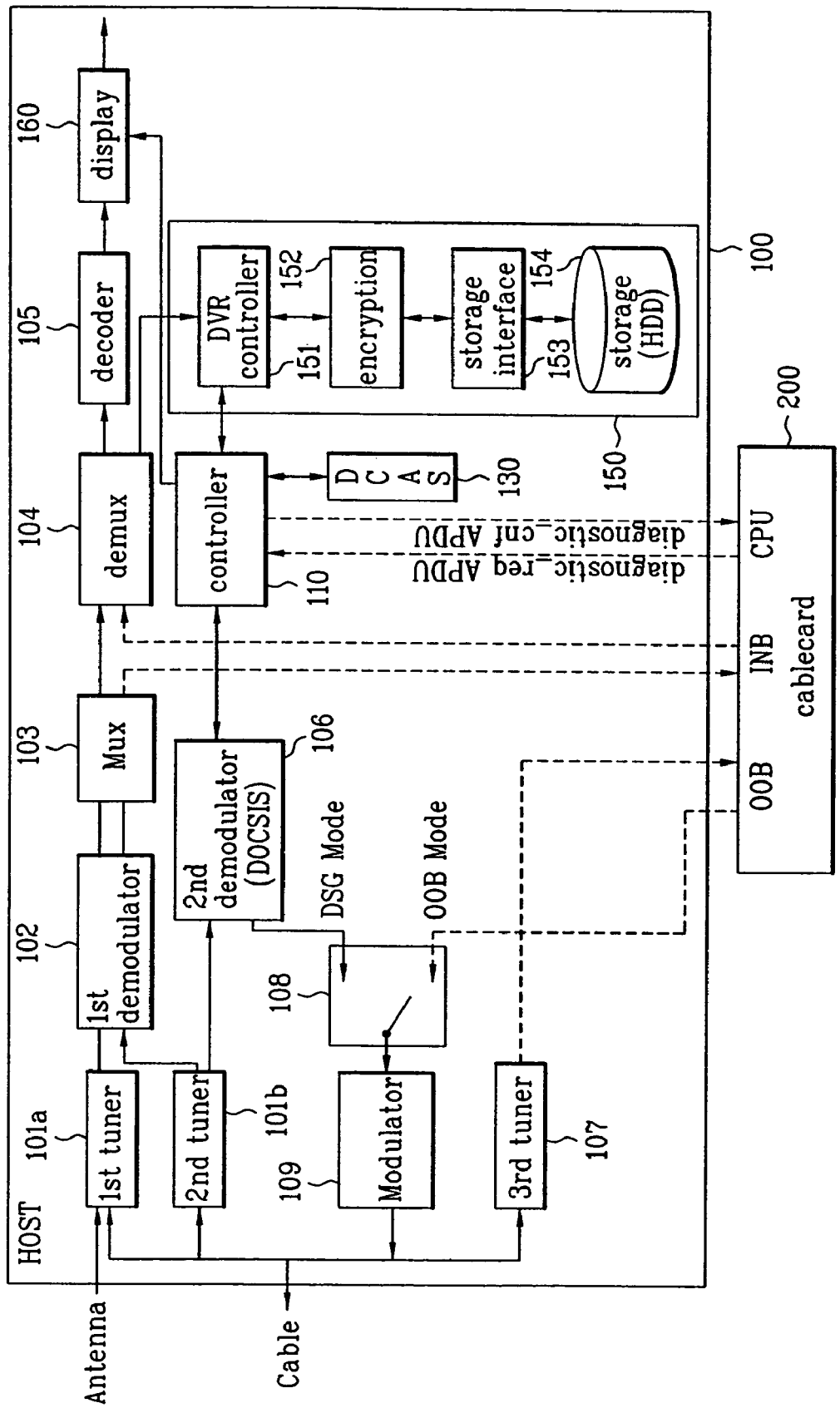
FIG. 2 is a block diagram of an exemplary broadcast receiver according to one embodiment of the present invention.

Reference will now be made in detail to the preferred embodiments of the present invention, examples of which are illustrated in the accompanying drawings. Wherever possible, the same reference numbers will be used throughout the drawings to refer to the same or like parts for simplicity.

As may be described herein, it may be possible to monitor a status of a broadcast receiver including its connection states with peripheral devices or devices built into the broadcast receiver. In the following, a function to monitor such status may be referred to as a diagnostic function or a status diagnostic function, and the diagnostic function may be used as a generic term to refer to a function to check states of the broadcast receiver such as its operating states, its connection states with peripheral devices, states of devices built into the broadcast receiver.

Recently, the DVR, which can store and present broadcasts as described above, has attracted considerable attention. The DVR may be used to describe any hardware/software platform in which the user may store digital video content. The DVR may be a standalone device or a device that may be included in a set-top box, a broadcast receiver such as a digital television set, a personal video recorder (PVR), and so on.

The DVR may include an OpenCable Application Platform (OCAP)-DVR defined in open cable (Opencable) specifications, which is used as middleware allowing digital software to be run on a broadcast receiver that serves as hardware.

Table 1 illustrates an example of definition of DVR status information in a diagnostic information presentation method for a broadcast receiver according to one embodiment of the present invention.

TABLE

| diagnostic information |
| --- |
| OCHD2 power status |
| OCHD2 boot status |
| OCHD2 memory allocation |
| Software version numbers of code in the OCHD2 |
| Firmware version |
| MAC addresses |
| OCHD2 network addresses |
| Status of FDC |
| Status of FAT |
| Status of RDC |
| Current channel status |
| IEEE-1394 Port status |
| DVI/HDMI Port status |
| Status of DOCSIS transport channels |
| DVR status |

If the user selects one or more of DVR diagnostic information items defined as in Table 1, the broadcast receiver may present corresponding DVR function diagnostic information on a screen of the broadcast receiver.

If the user requests the broadcast receiver to provide status information using a diagnostic ID value of "0x0D" according to a diagnostic request protocol, the broadcast receiver may create and present DVR status diagnostic information, collected using the diagnostic ID value, on the screen according to a diagnostic response protocol.

For example, a diagnostic ID value of "0x08" is used when the user requests the cable broadcast receiver to create DVI status information. A diagnostic ID value of "0x0A" is used when the user requests the broadcast receiver to check the status of a High Definition Multimedia Interface (HDMI) port. Other diagnostic ID values may be used to obtain a variety of diagnostic information (eCM, RDC status, and OCHD2 Network Address).

FIG. 1 illustrates an example syntax for DVR diagnostic information collected by the cable broadcast receiver according to one embodiment of the present invention. Various types of DVR diagnostic information defined in an embodiment of the present invention will now be described with reference to the syntax of FIG. 1.

In the syntax of FIG. 1, a function "DVR_status_report( )" is used to parse DVR diagnostic information collected by the cable broadcast receiver. When the user requests that the cable broadcast receiver present DVR diagnostic information, the cable broadcast receiver may activate the function "DVR_status_report( )" to obtain DVR diagnostic information and then to present the information on the screen.

In the function "DVR_status_report" of FIG. 1, information "Host_type" indicates whether or not the cable broadcast receiver has a DVR function or is associated with a DVR.

Examples of defined values of "Host_type" include the following:

"0x00" indicating that the cable broadcast receiver has no DVR function (or capability) or is not associated with a DVR;

"0x01" indicating that the DVR has an OpenCable Application Platform (OCAP)-DVR function;

"0x02" indicating that the DVR has a DVR function native to the manufacturer of the cable broadcast receiver;

"0x03" indicating that the DVR has a different type of DVR function; and

"0x04"-"0xFF" that are reserved.

In FIG. 1, if the value of "Host_type" is 0x01, 0x02, or 0x03, the cable broadcast receiver has a DVR function.

Information "DVR_storage_type" in the syntax of FIG. 1 indicates the type of a storage medium in which the DVR stores content for the DVR function.

Examples of defined values of "DVR_storage_type" include the following:

"0x00" indicating an internal Hard Disk Drive (HDD);

"0x02" indicating an external HDD;

"0x02" indicating a flash memory;

"0x03" indicating a memory card;

"0x04" indicating a different type of memory from these types; and

"0x05"-"0xFF" that are reserved.

Information "DVR_storage_status" in the syntax of FIG. 1 indicates the physical status of a storage medium in which the DVR stores content for the DVR function.

Examples of defined values of "DVR_storage_status" include the following:

"0x00" indicating that the status of the storage is OK;

"0x01" indicating that the storage has not been formatted;

"0x02" indicating that the storage has a bad sector;

"0x03" indicating that the storage is out of order; and

"0x04"-"0xFF" that are reserved.

Information "DVR_operation_status" in the syntax of FIG. 1 indicates the operating status of a DVR function included in the cable broadcast receiver or the operating status of a DVR supported by the cable broadcast receiver. Examples of defined values of "DVR_operation_status" include the following:

"0x01" indicating that the DVR function is disabled (i.e., off);

"0x02" indicating that a time shift feature of the DVR function is enabled (i.e., active);

"0x03" indicating that a recording feature of the DVR function is enabled (i.e., active); and "0x04"-"0xFF" that are reserved.

The time shift feature is a feature to select, pause, and play a current digital event, which is different from the recording feature to store a current event in order to select or view the event at a later time.

Information "Encryption_status" in the syntax of FIG. 1 indicates whether or not content stored in the storage medium through recording of the DVR has been encrypted.

Examples of defined values of "Encryption_status" include the following:

"$0_2$" indicating that the content has not been encrypted (i.e., encryption is disabled); and "$1_2$" indicating that the content has been encrypted (i.e., encryption is enabled).

Information "Storage_usage_status" in the syntax of FIG. 1 may indicate the usage status of a storage for digital content (for example, a hard disk drive).

Examples of defined values of "Storage_usage_status" include the following:

"0x00" indicating that the storage is empty;
"0x01" indicating that less than 25% of the storage is used;
"0x02" indicating that less than 50% of the storage is used;
"0x03" indicating that less than 75% of the storage is used;
"0x04" indicating that the storage is full (i.e., 100% of the storage is used); and
"0x05"-"0xFF" that are reserved.

The storage usage status information may be expressed in bytes.

The DVR status diagnostic information and the values thereof described above are only illustrative and can be easily modified by those skilled in the art.

FIG. 2 is a block diagram of an exemplary cable broadcast receiver according to one embodiment of the present invention. A description of how the cable broadcast receiver according to the embodiment may operate will now be given with reference to FIG. 2.

An embodiment of the cable broadcast receiver 100 according to this embodiment includes a DVR block 150. An embodiment of the cable broadcast receiver 100 may further include a cable card 200 for receiving cable broadcasts.

Dotted lines in FIG. 2 denote paths through which signals are carried when the cable broadcast receiver 100 includes the cable card 200. The cable card 200 and the signal paths denoted by the dotted lines are optional in this embodiment. In an alternative embodiment, the cable broadcast receiver 100 may include a built-in module that may perform a functional equivalent of a cable card.

Generally, the cable broadcast receiver 100 may be capable of receiving a cable broadcast signal alone or may be capable of receiving one or more of a cable broadcast signal, a terrestrial broadcast signal, and a satellite broadcast signal. In this embodiment, it is assumed that the cable broadcast receiver 100 may be capable of receiving one or more of a cable broadcast signal, a terrestrial broadcast signal, and a satellite broadcast signal.

Bidirectional communication between the cable broadcast receiver and the broadcast station may be performed in two modes. Specifically, an Out Of Band (OOB) mode and a Data Over Cable Service Interface Specification (DOCSIS) Settop Gateway (DSG) mode may be applied to provide upstream services in an open cable system. These modes may allow users to select and view desired programs through the cable broadcast receiver and also to participate in a broadcast program or to select and view desired information. Data broadcast services may also be provided using the OOB and DSG modes.

The OOB mode is a mode that may be defined for transmission between a cable broadcast station (headend) and InterSec equipment, for example, in a set-top box. The DSG mode is a mode that may be defined for transmission between a cable modem control system in a cable broadcast station and a DOCSIS-based cable modem, for example, in a set-top box.

The DOCSIS is a specification for digital cable televisions adopted by CableLabs, which is the US-based cable broadcast standardization and certification institute. In this specification, data may be transmitted using a cable modem.

The cable broadcast receiver in the embodiment of FIG. 2 may use a hybrid OOB/DSG mode. In the embodiment of FIG. 2, the cable broadcast receiver 100 may include a first tuner 101a, a second tuner 101b, a demodulator 102, a multiplexer 103, a demultiplexer 104, a decoder 105, a second demodulator 106, a third tuner 107, a switching unit 108, a controller 110, and a DVR block 150.

The first tuner 101a may be tuned to a specific channel frequency to select a corresponding broadcast among terrestrial Audio/Video (A/V) broadcasts received through an antenna or cable A/V broadcasts received in band through a cable and may output the selected broadcast signal to the first demodulator 102.

Terrestrial and cable broadcasts may use different transmission schemes. The first demodulator 102 may perform different demodulation processes for signals of different demodulation schemes. If terrestrial A/V broadcasts are transmitted after being modulated according to a vestigial sideband modulation (VSB) scheme and cable A/V broadcasts are transmitted after being modulated according to a Quadrature Amplitude Modulation (QAM) scheme, the first demodulator 102 may demodulate a signal selected by the first tuner 101a according to the VSB scheme or the QAM scheme determined based on the signal.

The multiplexer 103 may multiplex signals, demodulated by the first demodulator 102, and may output a cable broadcast signal to the cable card 200 and a terrestrial broadcast signal to the demultiplexer 104.

In the embodiment of FIG. 2, it is assumed that the cable card 200 can process multiple streams. Thus, the cable card 200 allows the user to watch a received broadcast, into which two or more streams have been multiplexed, through the cable broadcast receiver 100.

The demultiplexer 104 may receive and separate a multiplexed broadcast signal into a plurality of streams. The decoder 105 may decode a received broadcast signal into a video/audio signal that can be viewed by the user.

The second tuner 101b may be tuned to a specific channel frequency to select a corresponding broadcast among data broadcasts, which may be received through the cable according to the DSG mode, and may output the selected broadcast signal to the second demodulator 106. The second demodulator 106 may demodulate a data broadcast of the DSG mode and may output the demodulated broadcast signal to the controller 110.

The third tuner (for example, an OOB receiver) 107 may be tuned to a specific channel frequency to select a corresponding broadcast among downstream data broadcasts, which may be received through the cable according to the OOB mode, and may output the selected channel signal to the cable card 200.

When bidirectional communication is possible between the cable broadcast station and the broadcast receiver, the broadcast receiver may transmit upstream information, which contains, for example, a pay program request and diagnostic information, to the cable broadcast station according to the OOB or DSG mode. In an embodiment of the present invention, the broadcast receiver may include the switching unit 108 which makes it possible to select one of the above modes for data transmission.

In the OOB mode, user information or system diagnostic information may be output to a modulator 109 through the controller 110 and the switching unit 108, and the modulator 109 may modulate the output signal using QPSK modulation or the like and may transmit it to the cable broadcast station through the cable.

When broadcast information of the user is transmitted in the DSG mode, the information may be output to the modulator 109 through the cable card 200 and the switching unit 108, and the modulator 109 may modulate the output signal using QAM-16 modulation or the like and may transmit it to the cable broadcast station through the cable.

The cable broadcast receiver 100 may further include a downloadable conditional access system (DCAS) unit 130. When the cable headend transmits an encryption algorithm, the DCAS unit 130 may receive and run the encryption algorithm. Thus, when the cable broadcast receiver 100 includes the DCAS unit 130, the cable broadcast receiver 100 may be able to receive cable broadcasts without the cable card 200.

The DVR block 150 may include a DVR controller 151, an encryption unit 152, a storage interface 153, and a storage 154.

The DVR block 150 may store a broadcast stream of digital content received from the demultiplexer 104. The DVR controller 151 may receive and output a broadcast stream from the demultiplexer 104 and the encryption unit 152 may encode a signal output from the DVR controller 151. The encoded signal may be stored in a hard disk drive, which is an example of the storage 154, via the storage interface 152.

A request for DVR status diagnostic information received by the controller 110 may be forwarded to the DVR controller 151. The DVR controller 151 may collect and transmit the DVR status diagnostic information to the controller 110 and the controller 110 may transmit the DVR status diagnostic information to the cable card 200.

In the embodiment of FIG. 2, if the received broadcast is a terrestrial broadcast, the cable card 200 may be capable of receiving a multi-stream broadcast signal from the multiplexer 103. If the broadcast signal has been scrambled, the cable card 200 may descramble the broadcast signal so that a corresponding cable broadcast may be viewed properly.

The cable card 200 may request that the controller 110 in the cable broadcast receiver 100 diagnose the status of the DVR. The controller 110 may transmit the request for the DVR status diagnostic information to the DVR controller 151 and the DVR controller 151 may collect the DVR status diagnostic information.

The controller 110 may collect diagnostic information of the cable broadcast receiver under the control of the user. When the user requests diagnostic information of a DVR function of the cable broadcast receiver, the controller 110 may receive DVR status diagnostic information from the DVR controller 151 as described above.

A cable menu interface may be a user interface that allows a user to confirm diagnostic information corresponding to a diagnostic item selected by the user from a cable menu at a display unit 160 of the cable broadcast receiver 100. A selection of a user may be performed using a remote device.

The controller 110 may transmit the DVR status diagnostic information to the cable card 200. Alternatively or in addition to transmitting the DVR status diagnostic information, the controller 110 may transmit the DVR diagnostic information to the display unit 160 of the cable broadcast receiver 100 upon receiving a control signal input by the user to request that the DVR diagnostic information be presented on the screen of the cable broadcast receiver 100.

The display unit 160 may present the diagnostic information on the screen, thereby allowing the user to determine the DVR status based on the diagnostic information presented on the screen.

Figure 3:
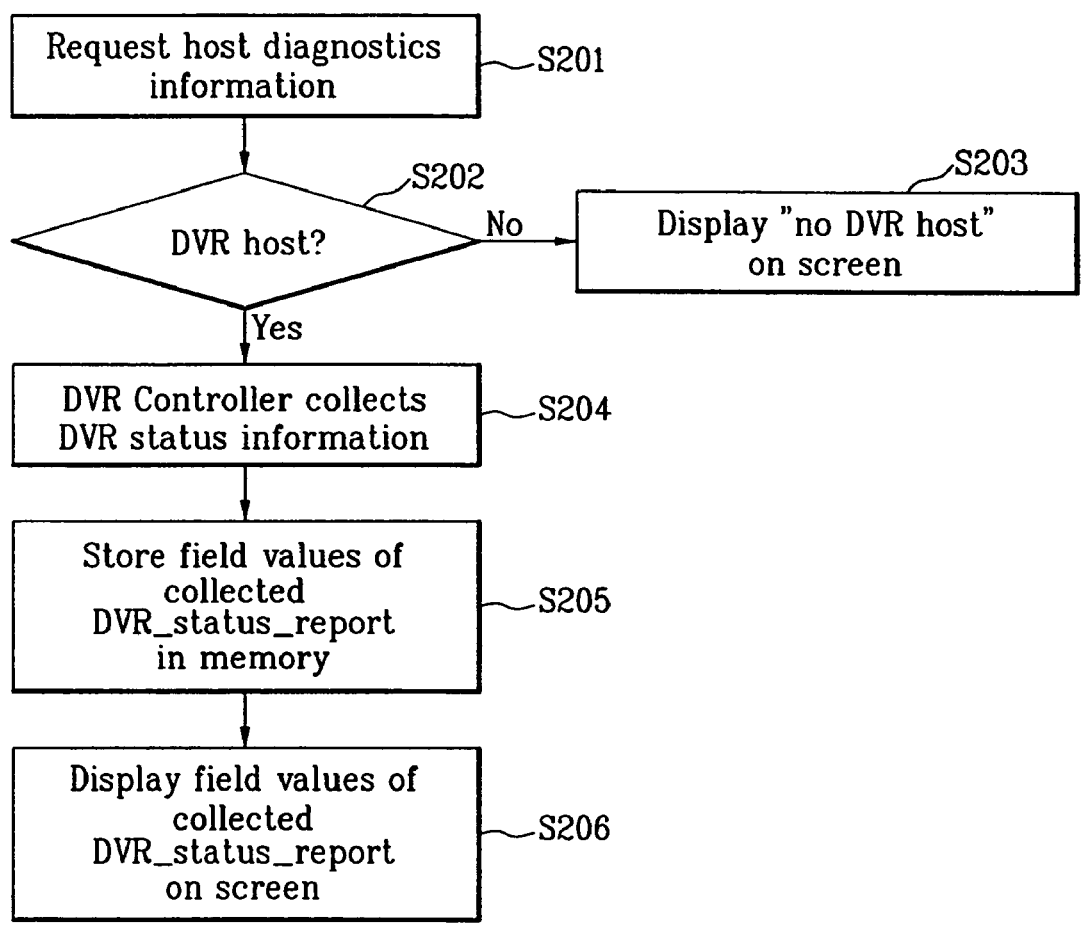
FIG. 3 is an exemplary flow chart of a method for presenting diagnostic information according to one embodiment of the present invention.

FIG. 3 is an exemplary flow chart of a method for presenting diagnostic information according to one embodiment of the present invention. The process of the flow chart may be performed by one or more controllers. The method for presenting diagnostic information will now be described with reference to FIG. 3.

At step S201 a request for diagnostic information is received. The process continues to step S202 where a determination is made whether or not there is a DVR function. If there is no DVR function, the process continues to step S203 where it is displayed that there is no DVR function.

On the other hand, if there is a DVR function, the process continues to step S204 where DVR status diagnostic information is collected. Then at step S205, the collected diagnostic information is stored. Optionally, the collected diagnostic information may be transmitted. The process continues to step S206 where the DVR diagnostic information is displayed.

As is apparent from the above description, the following advantages may be provided.

The broadcast receiver and the method may allow the user to monitor DVR status diagnostic information associated with each cable broadcast receiver on a screen of the cable broadcast receiver.

In addition, when the cable broadcast receiver has a DVR function, the cable broadcast receiver may diagnose the status of the DVR function and may present its diagnostic information to the user.

It will be appreciated that, in various of the above-disclosed and other features and functions, or alternatives thereof, they may be implemented on a programmed microprocessor, a microcontroller, an integrated circuit element such as ASIC, PLD, PLA, FPGA, or PAL, or the like, a hardwired electronic or logic circuit, or a programmable logic device.

It will be appreciated that the described flow processes, data structures, protocols, or tables can be implemented as a self-consistent sequence of computerized steps that lead to a desired result. These steps can be defined by and/or in one or more computer instructions stored in a computer-readable medium, or can be encompassed using a signal, or provided as software instructions to a processing device. These steps can be performed by a processor executing the instructions that define the steps. Further, the flow process can be performed by a processor executing one or more appropriate programs, by special purpose hardware designed to perform the method, or any combination of such hardware, firmware and software elements.

It will be appreciated that various of the above-disclosed and other features and functions, or alternatives thereof, may be desirably combined into many other different devices or applications. Also, various presently unforeseen or unanticipated alternatives, modifications, variations or improvements therein may be subsequently made by those skilled in the art, and are also intended to be encompassed by the following claims.

What is claimed is:

1. A host coupled to a cable card in a cable broadcast receiver, the host comprising:
   a controller configured to control to receive a request for diagnostic information on a Digital Video Recorder (DVR) from the cable card, parse the received request, collect diagnostic information on the DVR in accordance with the parsed request; and
   the controller further configured to control to display the collected diagnostic information via On Screen Display (OSD) and transmit the collected diagnostic information to the cable card, wherein the diagnostic information includes first information indicating whether or not the host has a DVR function, and the host has one of a first DVR function being used as middleware allowing digital software to be run on the cable broadcast receiver that serves as hardware and a second DVR function native to a manufacturer of the host if the host has the DVR function, second information indicating a type of a DVR storage and a status of the DVR storage, the status being at least one of normal, out of order, having not been formatted and having a bad sector, and third information indicating an operating status of the DVR function, wherein the diagnostic information is used to communicate by a generic diagnostic protocol between the host and the cable card, and wherein the operation status of the DVR function includes any one of a recording operation, and a time shift operation which means the DVR temporarily records an event of a content being currently received, and displays a recorded event at the same time.

2. The host of claim 1, wherein the type of the DVR storage includes one of an internal Hard Disk Drive (HDD), an external HDD and a memory card.

3. The host of claim 1, wherein the diagnostic information further includes fourth information whether a content stored in the DVR storage is encrypted or not.

4. The host of claim 3, wherein the diagnostic information further includes fifth information indicating a currently available capacity of the DVR storage.

5. The host of claim 4, further comprising:
a tuner configured to receive a cable broadcast signal;
a demodulator configured to demodulate the received cable broadcast signal;
a demultiplexer configured to demultiplex a broadcast stream carrying a digital content from the demodulated cable broadcast signal; and
a DVR unit configured to encrypt the demultiplexed broadcast stream and store the encrypted broadcast stream.

6. The host of claim 1, comprising an input unit that includes a remote device.

7. A method of providing a status for a host coupled to a cable card in a cable broadcast receiver, the method comprising:
receiving a request for diagnostic information on a digital video recorder (DVR) from the cable card;
parsing the received request;
collecting the diagnostic information on the DVR in accordance with the parsed request;
displaying the collected diagnostic information via on screen display (OSD); and
transmitting the collected diagnostic information to the cable card, wherein the diagnostic information includes first information indicating whether or not the host has a DVR function and the host has one of a first DVR function being used as middleware allowing digital software to be run on the cable broadcast receiver that serves as hardware and a second DVR function native to a manufacturer of the host if the host has the DVR function, second information indicating a type of a DVR storage and a status of the DVR storage, the status being at least one of normal, out of order, having not been formatted and having a bad sector, and third information indicating an operating status of the DVR function, wherein the diagnostic information is used to communicate by a generic diagnostic method defined between the host and the cable card, and wherein the operation status of the DVR function includes any one of a recording operation, and a time shift operation which means the DVR temporarily records an event of a content being currently received, and displays a recorded event at the same time.

8. The method of claim 7, further comprising the step of displaying a menu in order for a selection to be made.

9. The method of claim 7, further comprising:
receiving a cable broadcast signal:
demodulating the received cable broadcast signal:
demultiplexing a broadcast stream carrying a content from the demodulated cable broadcast signal;
encrypting the demultiplexed a broadcast stream; and
storing the encrypted broadcast stream.

10. The method of claim 7, wherein the type of the DVR storage includes one of an internal Hard Disk Drive (HDD), an external HDD and a memory card.

11. The method of claim 7, wherein the diagnostic information further includes fourth information whether a content stored in the DVR storage is encrypted or not, and fifth information indicating a currently available capacity of the DVR storage.

* * * * *